United States Patent
Nakashima et al.

(10) Patent No.: US 6,949,485 B2
(45) Date of Patent: Sep. 27, 2005

(54) GLASS FOR SUBSTRATE AND GLASS SUBSTRATE

(75) Inventors: Tetsuya Nakashima, Kanagawa (JP); Yasumasa Nakao, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/870,496

(22) Filed: Jun. 1, 2001

(65) Prior Publication Data

US 2002/0010066 A1 Jan. 24, 2002

(30) Foreign Application Priority Data

Jun. 1, 2000 (JP) .................................... 2000-164556
Jun. 1, 2000 (JP) .................................... 2000-164557

(51) Int. Cl.⁷ .......................... C03C 3/085; C03C 3/091; C03C 3/087
(52) U.S. Cl. .................... 501/69; 501/66; 501/67; 501/70
(58) Field of Search .................. 501/14, 15, 56, 501/65–71, 21; 428/428

(56) References Cited

U.S. PATENT DOCUMENTS

| | | | | |
|---|---|---|---|---|
| 5,304,516 A | * | 4/1994 | Clifford ........................ | 501/14 |
| 5,599,754 A | * | 2/1997 | Maeda et al. .................. | 501/69 |
| 5,776,844 A | * | 7/1998 | Koch et al. .................... | 501/69 |
| 5,780,371 A | | 7/1998 | Rifqi et al. .................... | 501/67 |
| 5,811,361 A | * | 9/1998 | Miwa ........................... | 501/70 |
| 5,854,152 A | * | 12/1998 | Kohli et al. ................... | 345/60 |
| 5,900,296 A | | 5/1999 | Hayashi et al. ............... | 428/64.1 |
| 5,925,583 A | * | 7/1999 | Yoshii et al. .................. | 501/70 |
| 6,054,401 A | * | 4/2000 | Sugiura et al. ................ | 501/69 |
| 6,087,284 A | * | 7/2000 | Brix et al. ..................... | 501/63 |
| 6,162,750 A | * | 12/2000 | Miwa et al. ................... | 501/69 |
| 6,162,751 A | * | 12/2000 | Speit et al. .................... | 501/73 |
| 6,268,304 B1 | * | 7/2001 | Maeda et al. .................. | 501/63 |
| 6,297,182 B1 | * | 10/2001 | Maeda et al. .................. | 501/66 |
| 6,319,867 B1 | * | 11/2001 | Chacon et al. ................ | 428/428 |

OTHER PUBLICATIONS

Shebly, James E., "Introduction to Glass Science and Technology", 1997, The Royal Society of Chemistry, p. 109.*
Vogel, Werner, Glass Chemistry, 1994, Springer–Verlag Berlin Heidelberg, 2$^{nd}$ Edition, pp. 24–25 and 30–31.*

* cited by examiner

Primary Examiner—Karl Group
Assistant Examiner—Elizabeth A. Bolden
(74) Attorney, Agent, or Firm—Oblon, Spivak, McClelland, Maier & Neustadt, P.C.

(57) ABSTRACT

A glass for substrate, which consists, as represented by mass percentage, essentially of:

| | |
|---|---|
| $SiO_2$ | 40 to 59%, |
| $Al_2O_3$ | 5 to 20%, |
| $B_2O_3$ | 0 to 8%, |
| MgO | 0 to 10%, |
| CaO | 0 to 12%, |
| SrO | 2 to 20%, |
| BaO | 0 to 2%, |
| ZnO | 0 to 4%, |
| $Li_2O$ | 0 to 2%, |
| $Na_2O$ | 0 to 10%, |
| $K_2O$ | 0 to 12%, |
| $TiO_2$ | 0 to 10%, and |
| $ZrO_2$ | 0 to 5%, | wherein MgO+CaO+SrO+BaO is at least 15%.

16 Claims, No Drawings

GLASS FOR SUBSTRATE AND GLASS SUBSTRATE

BACKGROUND OF THE INVENTION

1. Field of the Invention

The present invention relates to a glass for substrate to be used for e.g. a substrate for a data storage medium such as a magnetic disc or an optical disc, or a substrate for a flat display such as PDP (plasma display panel) or a FED (field emission display), and a glass substrate.

2. Discussion of Background

Soda lime silica glass is widely employed as a glass for substrate to be used for e.g. a substrate for a data storage medium or a substrate for a flat display panel.

However, a substrate made of soda lime silica glass has had a problem that the surface conditions are likely to substantially change during the stock due to so-called a corrosion phenomenon. Especially, in the case of a magnetic disc substrate, a layer such as an undercoat layer, a magnetic layer or a protective layer formed on the substrate is likely to be peeled.

By chemical strengthening treatment, soda lime silica glass may be made to be scarcely susceptible to a corrosion phenomenon. However, such chemical strengthening treatment brings about a problem that the number of process steps is obliged to increase, and a stain tends to deposit on the surface of the substrate after the chemical strengthening treatment.

SUMMARY OF THE INVENTION

It is an object of the present invention to provide a glass for substrate which is excellent in corrosion resistance even without application of additional treatment such as chemical strengthening treatment and which is scarcely susceptible to a corrosion phenomenon.

The present invention provides a glass for substrate, which consists, as represented by mass percentage, essentially of:

| | |
|---|---|
| $SiO_2$ | 40 to 59%, |
| $Al_2O_3$ | 5 to 20%, |
| $B_2O_3$ | 0 to 8%, |
| MgO | 0 to 10%, |
| CaO | 0 to 12%, |
| SrO | 2 to 20%, |
| BaO | 0 to 2%, |
| ZnO | 0 to 4%, |
| $Li_2O$ | 0 to 2%, |
| $Na_2O$ | 0 to 10%, |
| $K_2O$ | 0 to 12%, |
| $TiO_2$ | 0 to 10%, and |
| $ZrO_2$ | 0 to 5%, | wherein MgO+CaO+SrO+BaO is at least 15%.

Further, the present invention provides a glass substrate made of such glass for substrate, wherein the number of attachments having sizes of at least 10 $\mu$m present on the surface of the glass substrate held in a steam atmosphere at 120° C. under 2 atm for 20 hours, is not more than $1/cm^2$, and the number of attachments having sizes of from 1 $\mu$m to less than 10 $\mu$m so present, is not more than $10^5/cm^2$.

DETAILED DESCRIPTION OF THE PREFERRED EMBODIMENTS

The glass for substrate of the present invention is useful for a substrate for a data storage medium such as a magnetic disc or an optical disc, or for a substrate for a flat display such as PDP or FED.

The average linear expansion coefficient within a range of from 50 to 350° C. of the glass for substrate of the present invention is preferably substantially the same or more than soda lime silica glass, i.e. at least $70 \times 10^{-7}/°$ C., more preferably at least $75 \times 10^{-7}/°$ C. Hereinafter, the average linear expansion coefficient within a range of from 50 to 350° C. will be referred to simply as an expansion coefficient.

The above expansion coefficient is preferred for the reason that in the case of a substrate for a data storage medium, the expansion coefficient is preferably close to the expansion coefficient (typically at least $100 \times 10^{-7}/°$ C.) of metal of a hub to be attained to the substrate, i.e. at least the expansion coefficient of soda lime silica glass which has heretofore been employed. In the case of a flat display panel substrate, the expansion coefficient of a conventional inorganic material powder such as glass frit which used to be employed for sealing, is in conformity with the expansion coefficient of a soda lime silica glass substrate, and the above-mentioned level of the thermal expansion coefficient is preferred to conform it to the expansion coefficient of the conventional inorganic material powder.

The glass transition temperature of the glass for substrate of the present invention is preferably at least 600° C., more preferably at least 610° C., most preferably at least 620° C.

The above glass transition temperature is preferred for the reason that in the case of a substrate for a data storage medium, increase of the storage density will be thereby facilitated.

Namely, to increase the storage density, it is effective to increase the coercive force of the magnetic layer which is a magnetic recording layer, and for this purpose, it is required to carry out heat treatment for forming the magnetic layer at a higher temperature. If the glass transition temperature of the glass to be used for a substrate for a data storage medium, is lower than 600° C., such heat treatment may not be carried out at the desired temperature.

Further, with respect to a flat panel display substrate, it is thereby possible to readily suppress a dimensional change such as a deformation or shrinkage which is likely to occur in the glass substrate by heat treatment in the process for preparing the display.

Namely, if there is a substantial dimensional change, alignment of the front substrate and the rear substrate tends to be difficult, and along with increasing refinement of the display, in recent years, the allowance in the dimensional change tends to be increasingly small. If the glass transition temperature of the glass to be used for a flat plane display substrate is lower than 600° C., the dimensional change due to deformation or shrinkage occurring in the glass substrate by the above-mentioned heat treatment, is likely to be too large to meet the allowance.

With the glass for substrate of the present invention, it is preferred that the difference $\Delta T(=T_L-T_4)$ between the temperature $T_4$ at which the viscosity becomes $10^4 P$ and the liquidus temperature $T_L$, is at most 50° C., i.e. $\Delta T \leq 50°$ C. If $\Delta T$ exceeds 50° C., molding tends to be difficult. It is more preferably at most 30° C., particularly preferably at most 0° C.

The glass for substrate of the present invention preferably consists, as represented by mass percentage, essentially of:

| | |
|---|---|
| SiO$_2$ | 40 to 59%, |
| Al$_2$O$_3$ | 5 to 20%, |
| B$_2$O$_3$ | 0 to 8%, |
| MgO | 0 to 10%, |
| CaO | 0 to 12%, |
| SrO | 2 to 20%, |
| BaO | 0 to 2%, |
| ZnO | 0 to 4%, |
| Li$_2$O | 0 to 2%, |
| Na$_2$O | 0 to 10%, |
| K$_2$O | 0 to 12%, |
| TiO$_2$ | 0 to 10%, and |
| ZrO$_2$ | 0 to 5%, | wherein MgO+CaO+SrO+BaO is at least 15%, and Al$_2$O$_3$+TiO$_2$ is at least 11%.

Now, the composition of the glass for substrate of the present invention will be described, as represented by mass percentage.

SiO$_2$ is an essential component to form the network of glass. If it is less than 40%, the glass tends to be unstable, or chemical durability, particularly acid resistance, tends to be low. It is preferably at least 41%, more preferably at least 45%, particularly preferably at least 49%, most preferably at least 50%. If it exceeds 59%, the expansion coefficient tends to be too small. It is preferably at most 58.5%.

Al$_2$O$_3$ is essential and has an effect to increase the corrosion resistance of the glass or an effect to increase the glass transition temperature. If it is less than 5%, such effects tend to be small. It is preferably at least 6%. If it exceeds 20%, the viscosity of the molten glass tends to be too high, or the liquidus temperature tends to be too high, whereby molding tends to be difficult. It is preferably at most 19%, more preferably at most 17%, particularly preferably at most 15%.

B$_2$O$_3$ is not essential, but has an effect to increase the corrosion resistance of the glass, and it may be contained up to 8%. If it exceeds 8%, the expansion coefficient tends to be too small. It is preferably at most 7%. When B$_2$O$_3$ is contained, it is preferably contained in an amount of at least 1%.

MgO is not essential, but has an effect to lower the viscosity of the molten glass and to facilitate melting of the glass, and it may be contained up to 10%. If it exceeds 10%, the glass is likely to be unstable. It is preferably at most 9%. When MgO is contained, it is preferably contained in an amount of at least 1%.

CaO is not essential, but has an effect to lower the viscosity of the molten glass and to facilitate melting of the glass, and it may be contained up to 12%. If it exceeds 12%, the glass is likely to be unstable. It is preferably at most 11%. When CaO is contained, it is preferably contained in an amount of at least 1%. When it is desired to further improve the corrosion resistance, or to further lower the liquidus temperature, it is preferred that substantially no CaO is contained.

SrO is essential and has an effect to increase the expansion coefficient and to lower the viscosity of the molten glass and facilitate melting of the glass. If it is less than 2%, such effects tend to be small. It is preferably at least 3%, more preferably at least 6%, particularly preferably at least 9%, most preferably at least 10%. If it exceeds 20%, the glass tends to be unstable. It is preferably at most 17%, more preferably at most 15%, particularly preferably at most 14.5%, most preferably at most 14%.

BaO is not essential, but has an effect to increase the expansion coefficient, and to lower the viscosity of the molten glass and facilitate melting of the glass, and it may be contained up to 2%. If it exceeds 2%, the corrosion resistance of the glass tends to be impaired. It is preferably at most 1.8%. When BaO is contained, it is preferably contained in an amount of at least 0.2%. In a case where it is desired to further improve the corrosion resistance, it is preferred that substantially no BaO is contained.

The total content of MgO, Cao, SrO and BaO is at least 15%. If the total content is less than 15%, the viscosity of the molten glass tends to be too high, and melting of the glass tends to be difficult, or the expansion coefficient tends to be too small. The total content is preferably at least 15.2%.

ZnO is not essential, but has an effect to increase the expansion coefficient, and to lower the viscosity of the molten glass and facilitate melting of the glass, and it may be contained up to 4%. It is preferably at most 2%.

Li$_2$O is not essential, but has an effect to increase the expansion coefficient, and to lower the viscosity of the molten glass and facilitate melting of the glass, and it may be contained up to 2%. If it exceeds 2%, it tends to deteriorate the corrosion resistance of the glass. It is preferably at most 1.9%, more preferably at most 1.5%, particularly preferably at most 1%. When Li$_2$O is contained, it is preferably contained in an amount of at least 0.1%.

The total content of ZnO and Li$_2$O is preferably at most 2%.

Na$_2$O is not essential, but has an effect to increase the expansion coefficient, and to lower the viscosity of the molten glass and facilitate melting of the glass, and it may be contained up to 10%. If it exceeds 10%, it tends to deteriorate the corrosion resistance of the glass. It is preferably at most 8%. When Na$_2$O is contained, it is preferably contained in an amount of at least 2%.

K$_2$O is not essential, but has an effect to increase the expansion coefficient, and to lower the viscosity of the molten glass and facilitate melting of the glass, and it may be contained up to 12%. If it exceeds 12%, it tends to deteriorate the corrosion resistance of the glass. It is preferably at most 10%, more preferably at most 8%, particularly preferably at most 6%, most preferably less than 3.5%. When K$_2$O is contained, it is preferably contained in an amount of at least 2%.

The total content of BaO, Na$_2$O and K$_2$O is preferably at most 14%. If the total content exceeds 14%, the corrosion resistance is likely to be low. The total content is more preferably at most 13%, particularly preferably at most 12%.

Further, the total content of BaO, Li$_2$O, Na$_2$O and K$_2$O is preferably at most 14%. If the total content exceeds 14%, the corrosion resistance is likely to be low. The total content is more preferably at most 13%, particularly preferably at most 12%.

TiO$_2$ is not essential, but has an effect to increase the expansion coefficient, to increase the corrosion resistance of the glass, or to increase the glass transition temperature, and it may be contained up to 10%. If it exceeds 10%, the glass is likely to be unstable. It is preferably at most 9%. When TiO$_2$ is contained, it is preferably contained in an amount of at least 1%, more preferably at least 2%. In a case where it is desired to further suppress the phase separation or coloring, or to further lower the liquidus temperature, it is preferred that substantially no TiO$_2$ is contained.

The total content of Al$_2$O$_3$ and TiO$_2$ is preferably at least 11%. If the total content is less than 11%, the corrosion resistance is likely to be low. The total content is preferably at least 13%, particularly preferably at least 15%, most preferably at least 16%.

ZrO$_2$ is not essential, but has an effect to increase the corrosion resistance of the glass, and to increase the glass transition temperature, and it may be contained up to 5%. If it exceeds 5%, the glass is likely to be unstable, or the liquidus temperature is likely to be too high. It is preferably at most 4%. When ZrO$_2$ is contained, it is preferably contained in an amount of at least 1%.

The glass of the present invention consists essentially of the above-described components, but other components may be contained in a range not to impair the purpose of the present invention. The total content of such other components is preferably at most 10%, more preferably at most 5%.

For example, a refining agent such as $SO_3$, Cl, $As_2O_3$ or $Sb_2O_3$, may be contained. The total content of such refining agents is preferably at most 1%.

When it is desired to color the glass, a colorant such as $Fe_2O_3$, NiO or CoO, may be contained. The total content of these colorants is preferably at most 1%.

The sum of the total content of the above-mentioned refining agents and the total content of the above-mentioned colorants, is preferably at most 1%.

In order to improve the melting property or the stability of the glass, melting accelerators such as $P_2O_5$ and $V_2O_5$ may be incorporated. The total content of such melting accelerators is preferably at most 2%.

When it is desired to increase the Young's modulus, rare earth metal oxides such as $La_2O_3$ and $Y_2O_3$ may be incorporated. The total content of such rare earth metal oxides is preferably at most 9%, more preferably at most 2%.

The sum of the total content of the above melting accelerators and the total content of the above rare earth metal oxides, is preferably at most 2%.

The glass substrate of the present invention is useful as a substrate for a data storage medium such as a magnetic disc or an optical disc or for a flat display such as PDP or FED.

The glass substrate of the present invention is made of the glass for substrate of the present invention, and when the surface is thoroughly cleaned to such a state where no attachments are observed, and then the substrate is maintained in a steam atmosphere at 120° C. under 2 atm for 20 hours, the number $N_L$ of attachments having sizes of at least 10 µm, present on the surface of the glass substrate is at most 1/cm$^2$, and the number $N_S$ of attachments having sizes of from 1 µm to less than 10 µm so present, is not more than $10^5$/cm$^2$.

If $N_L$ exceeds 1/cm$^2$, or if $N_S$ exceeds $10^5$/cm$^2$, attachments (corrosion) tend to form on the surface of the glass substrate during the stock of the glass substrate, and in the case of the magnetic disc, a layer such as an undercoat layer, a magnetic layer or a protective layer formed on the glass substrate, is likely to peel. Further, in the case of a flat display panel, the glass substrate is likely to fog, or dielectric breakdown is likely to occur due to the above-mentioned attachments formed at the lead out portion of the terminal, whereby the reliability of the flat display panel decreases. Such attachments are considered to be a reaction product formed and deposited on the glass substrate by the influence of moisture and carbon dioxide gas in air, and they can not be wiped off. $N_L$ is preferably at most 0.5/cm$^2$, more preferably at most 0.2/cm$^2$. $N_S$ is preferably at most 0.8× $10^5$/cm$^2$, more preferably at most 0.6×$10^5$/cm$^2$.

Methods for preparing the glass for substrate and the glass substrate of the present invention are not particularly limited, and various methods may be employed. For example, materials of the respective components which are commonly used, are mixed to have a desired composition, and the mixture is heated and melted in a glass melting furnace. The glass is homogenized by bubbling, stirring or addition of a refining agent and formed into a sheet glass having a predetermined thickness by a well-known float process, a pressing method or a down draw process, and after annealing, processing such grinding or polishing may be carried out as the case requires and then formed into a glass substrate having a predetermined size and shape. As the forming method, a float process is preferred which is particularly suitable for a mass production.

EXAMPLES

Materials of various components were mixed to obtain a composition as shown, by mass percentage, in the lines from $SiO_2$ to $ZrO_2$ in the Table, and melted at a temperature of from 1,550 to 1,650° C. for from 3 to 5 hours by means of a platinum crucible. Then, the molten glass was cast to form a sheet product, followed by annealing. In the Table, RO total represents the total content of MgO, CaO, SrO and BaO, AlTi represents the total content of $Al_2O_3$ and $TiO_2$, and BLNK represents the total content of BaO, $Li_2O$, $Na_2O$ and $K_2O$.

With respect to the glass sheet thus obtained, the expansion coefficient α (unit: ×$10^{-7}$/° C.), the above-mentioned $N_L$ (unit: number/cm$^2$), the above-mentioned $N_S$ (unit: $10^4$/cm$^2$), the density ρ (unit: g/cm$^3$), the glass transition temperature $T_g$ (unit: ° C.), the liquidus temperature $T_L$ (unit: ° C.), the temperature $T_4$ (unit: ° C.) at which the viscosity becomes $10^4$P, and the temperature $T_2$ (unit: ° C.) where the viscosity becomes $10^2$P, were measured by the following methods. The results are shown in the Table. Symbol "–" in the Table means that no measurement was carried out.

α: Using a differential dilatometer and employing quartz glass as a reference sample, the elongation of glass when the temperature was raised from room temperature at a rate of 5° C./min, was measured to the temperature where no elongation was observed even when the glass was softened, i.e. the yield point, and from the obtained thermal expansion curve, an average linear expansion coefficient within a range of from 50 to 350° C., was calculated.

$N_L$, $N_S$: Both sides of a glass sheet having a thickness of from 1 to 2 mm and a size of 4 cm×4 cm were polished, washed by means of calcium carbonate and a detergent, then put into a super accelerated life tester (an unsaturated type autoclave TPC-410, manufactured Tabai Espec K.K.) and left in a steam atmosphere at 120° C. under 2 atm for 20 hours. The glass sheet was taken out, and a square area of 200 µm×200 µm on the surface was observed by a differential interference microscope, and the number of attachments having sizes of at least 10 µm and the number of attachments having sizes of from 1 µm to less than 10 µm, were counted, and $N_L$ and $N_S$ were calculated from these numbers and the above-mentioned area of observation of 200 µm×200 µm.

ρ: Measured by an Archimedes method.

$T_g$: The temperature corresponding to the inflection point in the thermal expansion curve obtained in the same manner as the measurement of the above α, was taken as the glass transition temperature.

$T_L$: The glass was pulverized into glass particles of about 2 mm by a mortar, and the glass particles were placed on a platinum boat and heat-treated for 24 hours in a temperature gradient furnace. The maximum temperature that the glass was devitrified, was taken as the liquidus temperature. To carry out float forming, $T_L$ is preferably not higher than $T_4$.

$T_4$, $T_2$: Measured by a rotational viscometer.

Glasses of Examples 1 to 8, 11 and 13 to 15 represent Examples of the present invention. The glass of Example 16 is soda lime silica glass, the glass of Example 17 is aluminosilicate glass which has been used for a magnetic disc, the glass of Example 18 is aluminosilicate glass which has been used for PDP, and the glasses of Examples 19 to 21 are chemically strengthened glasses for magnetic discs disclosed in U.S. Pat. No. 5,780,371 and they are aluminosilicate glass. The glasses of Examples 9, 10, 12 and 16 to 21 represent Comparative Examples.

TABLE 1

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| $SiO_2$ | 51.3 | 52.0 | 55.1 | 53.1 | 52.7 | 54.6 | 52.8 | 43.9 |
| $Al_2O_3$ | 12.6 | 12.6 | 13.3 | 13.0 | 14.4 | 13.2 | 8.3 | 16.5 |
| $B_2O_3$ | 0 | 0 | 0 | 2.2 | 0 | 0 | 3.1 | 0 |
| MgO | 2.6 | 2.8 | 5.2 | 3.2 | 3.2 | 6.0 | 2.8 | 2.6 |
| CaO | 4.1 | 4.1 | 7.7 | 8.0 | 7.7 | 4.3 | 4.1 | 8.9 |
| SrO | 10.6 | 12.4 | 2.4 | 4.0 | 4.6 | 5.1 | 12.6 | 14.0 |
| BaO | 0 | 0 | 0 | 0 | 0 | 0 | 0 | 0.5 |
| $Li_2O$ | 0 | 0 | 0 | 0 | 0 | 0 | 0 | 0 |
| $Na_2O$ | 4.8 | 4.5 | 5.3 | 4.5 | 4.6 | 4.7 | 4.6 | 2.3 |
| $K_2O$ | 6.7 | 6.8 | 5.5 | 6.8 | 7.6 | 7.1 | 6.9 | 2.5 |
| $TiO_2$ | 5.2 | 4.8 | 5.5 | 2.4 | 2.4 | 5.0 | 4.8 | 8.8 |
| $ZrO_2$ | 2.1 | 0 | 0 | 2.8 | 2.8 | 0 | 0 | 0 |
| RO total | 17.3 | 19.3 | 15.3 | 15.2 | 15.5 | 15.4 | 19.5 | 26.0 |
| AlTi | 17.8 | 17.4 | 18.8 | 15.4 | 16.8 | 18.2 | 13.1 | 25.3 |
| BLNK | 11.5 | 11.3 | 10.8 | 11.3 | 12.2 | 11.8 | 11.5 | 5.3 |
| α | 85 | 85 | 80 | 81 | 84 | 82 | 86 | 75 |
| $N_L$ | 0 | 0 | 0 | 0 | 0 | 0 | 0 | 0 |
| $N_S$ | 3 | 3 | 2 | 1 | 5 | 2 | 2 | 1 |
| ρ | 2.74 | 2.73 | 2.63 | 2.64 | 2.66 | 2.64 | 2.70 | 2.89 |
| $T_g$ | 671 | 659 | 667 | 660 | 677 | 667 | 619 | 710 |
| $T_L$ | 1102 | 1114 | — | — | — | — | — | — |
| $T_4$ | 1124 | 1114 | — | — | — | — | — | — |
| $T_2$ | 1497 | 1499 | — | — | — | — | — | — |

|  | Ex. 9 | Ex. 10 | Ex. 11 | Ex. 12 | Ex. 13 | Ex. 14 | Ex. 15 |
|---|---|---|---|---|---|---|---|
| $SiO_2$ | 58.5 | 51.5 | 54.2 | 52.1 | 53.1 | 52.8 | 52.8 |
| $Al_2O_3$ | 6.4 | 16.0 | 12.5 | 13.5 | 13.3 | 13.4 | 13.4 |
| $B_2O_3$ | 0 | 0.5 | 0 | 0 | 0 | 0 | 0 |
| MgO | 5.1 | 2.4 | 1.0 | 3.0 | 2.9 | 3.7 | 3.6 |
| CaO | 5.0 | 6.9 | 4.0 | 7.9 | 0 | 0 | 0 |
| SrO | 8.3 | 9.2 | 12.3 | 9.5 | 13.5 | 14.0 | 14.0 |
| BaO | 0 | 0 | 0 | 0 | 0 | 0 | 0 |
| $Li_2O$ | 0 | 0 | 0 | 0 | 0.4 | 0.4 | 0.4 |
| $Na_2O$ | 4.7 | 5.0 | 4.5 | 4.6 | 6.3 | 7.0 | 6.3 |
| $K_2O$ | 7.0 | 6.2 | 6.8 | 5.7 | 4.1 | 3.2 | 4.0 |
| $TiO_2$ | 5.0 | 0 | 4.7 | 1.0 | 4.6 | 4.1 | 4.1 |
| $ZrO_2$ | 0 | 2.3 | 0 | 2.7 | 1.8 | 1.4 | 1.4 |
| RO total | 18.4 | 18.5 | 17.3 | 20.4 | 16.4 | 17.7 | 17.6 |
| AlTi | 11.4 | 16.0 | 17.2 | 14.5 | 17.9 | 17.5 | 17.5 |
| BLNK | 11.7 | 11.2 | 11.3 | 10.3 | 10.8 | 10.6 | 10.7 |
| α | 84 | 83 | 83 | 82 | 82 | 82 | 83 |
| $N_L$ | 0 | 0 | 0 | 0 | 0 | 0 | 0 |
| $N_S$ | 7 | 6 | 1 | 7 | 2 | 3 | 2 |
| ρ | 2.66 | 2.69 | 2.70 | 2.72 | 2.73 | 2.74 | 2.74 |
| $T_g$ | 645 | 660 | 660 | 672 | 633 | 628 | 630 |
| $T_L$ | — | — | — | — | 1119 | 1102 | 1102 |
| $T_4$ | — | — | — | — | 1120 | 1102 | 1105 |
| $T_2$ | — | — | — | — | 1532 | 1497 | 1502 |

|  | Ex. 16 | Ex. 17 | Ex. 18 | Ex. 19 | Ex. 20 | Ex. 21 |
|---|---|---|---|---|---|---|
| $SiO_2$ | 72.5 | 63.0 | 58.0 | 53.6 | 48.5 | 54.6 |
| $Al_2O_3$ | 1.0 | 14.0 | 12.0 | 10.0 | 14.8 | 3.0 |
| $B_2O_3$ | 0 | 0 | 0 | 2.2 | 0 | 0 |
| MgO | 2.5 | 0 | 2.0 | 4.2 | 3.8 | 4.2 |
| CaO | 9.5 | 0 | 5.0 | 6.8 | 6.6 | 3.5 |
| SrO | 0 | 0 | 2.0 | 7.0 | 7.0 | 8.0 |
| BaO | 0 | 0 | 6.0 | 2.8 | 5.5 | 3.8 |
| $Li_2O$ | 0 | 6.0 | 0 | 0 | 0 | 0 |
| $Na_2O$ | 14.0 | 10.0 | 4.5 | 5.2 | 5.3 | 6.0 |
| $K_2O$ | 0.5 | 0 | 8.5 | 6.2 | 6.5 | 6.9 |
| $TiO_2$ | 0 | 0 | 0 | 0 | 0 | 0 |
| $ZrO_2$ | 0 | 7.0 | 2.0 | 2.0 | 2.0 | 10.0 |
| RO total | 12.0 | 0 | 15.0 | 20.8 | 22.9 | 19.5 |
| AlTi | 1.0 | 14.0 | 12.0 | 10.0 | 14.8 | 3.0 |
| BLNK | 14.5 | 16.0 | 19.0 | 14.2 | 17.3 | 16.7 |
| α | 85 | 90 | 84 | — | — | — |
| $N_L$ | 10000 | 20000 | 0 | 0 | 0 | 0 |
| $N_S$ | 50 | 40 | 40 | 40 | 30 | 30 |
| ρ | 2.50 | 2.52 | 2.63 | — | — | — |
| $T_g$ | 550 | 500 | 649 | — | — | — |

According to the present invention, a glass substrate for a data storage medium and a glass substrate for a flat display, having the following characteristics can be provided.

(1) The corrosion resistance is excellent without application of chemical strengthening treatment, and attachments (corrosion) scarcely form during the stock.

(2) The expansion coefficient is substantially the same or higher than soda lime silica glass which has been commonly used.

(3) The glass transition temperature is high, and the storage density of a data storage medium can be increased, and the flat display image can be made finer.

What is claimed is:

1. A glass substrate for a data storage medium, which consists essentially of: in terms of weight percent

| | |
|---|---|
| $SiO_2$ | 40 to 59%, |
| $Al_2O_3$ | 5 to 20%, |
| $B_2O_3$ | 0 to 8%, |
| MgO | 0 to 10%, |
| CaO | 0 to 12%, |
| SrO | 10.6 to 20%, |
| BaO | 0 to 2%, |
| ZnO | 0 to 4%, |
| $Li_2O$ | 0 to 2%, |
| $Na_2O$ | 0 to 10%, |
| $K_2O$ | 0 to 8%, |
| $TiO_2$ | 2 to 10%, and |
| $ZrO_2$ | 0 to 5%, | wherein MgO+CaO+SrO+BaO is at least 15%;
$Al_2O_3+TiO_2$ is at least 13%;
$TiO_2+ZrO_2$ is at least 2.3%; and which has an average linear expansion coefficient of at least $70 \times 10^{-7}/°$ C. within the range of 50 to 350° C., wherein the glass has a glass transition temperature of at least 600° C., and wherein the number of attachments having sizes ranging from 1 μm to less than 10 μm present on the surface of the glass substrate held in a steam atmosphere at 120° C. under 2 atm for 20 hours, is not more than $5 \times 10^4/cm^2$.

2. The glass substrate according to claim 1, wherein $BaO+Li_2O+Na_2O+K_2O$ is at most 14%.

3. The glass substrate according to claim 2, wherein $Li_2O+ZnO$ is at most 2%.

4. The glass substrate according to claim 1, wherein $Li_2O+ZnO$ is at most 2%.

5. The glass substrate as defined in claim 1, wherein the number of attachments having sizes of at least 10 μm present on the surface of the glass substrate held in a steam atmosphere at 120° C. under 2 atm for 20 hours, is not more than $1/cm^2$.

6. The glass substrate as defined in claim 2, wherein the number of attachments having sizes of at least 10 μm present on the surface of the glass substrate held in a steam atmosphere at 120° C. under 2 atm for 20 hours, is not more than $1/cm^2$.

7. The glass substrate as defined in claim 3, wherein the number of attachments having sizes of at least 10 μm present on the surface of the glass substrate held in a steam atmosphere at 120° C. under 2 atm for 20 hours, is not more than $1/cm^2$.

8. The glass substrate as defined in claim 4, wherein the number of attachments having sizes of at least 10 μm present on the surface of the glass substrate held in a steam atmosphere at 120° C. under 2 atm for 20 hours, is not more than $1/cm^2$.

9. The glass substrate according to claim 1, wherein CaO is substantially excluded from the components of the glass.

10. The glass substrate according to claim 1, wherein $Al_2O_3+TiO_2$ is at least 15%.

11. The glass substrate according to claim 10, wherein $Al_2O_3+TiO_2$ is at least 16%.

12. The glass substrate according to claim 1, wherein the number of attachments having sizes ranging from 1 μm to less than 10 μm present on the surface of the glass substrate held in a steam atmosphere at 120° C. under 2 atm for 20 hours, is not more than $3 \times 10^4/cm^2$.

13. A magnetic disc, which comprises:
an undercoat layer, a magnetic layer and a protective layer formed on a glass substrate as claimed in claim 1, which consists essentially of, in terms of weight percent:

| | |
|---|---|
| $SiO_2$ | 40 to 59%, |
| $Al_2O_3$ | 5 to 20%, |
| $B_2O_3$ | 0 to 8%, |
| MgO | 0 to 10%, |
| CaO | 0 to 12%, |
| SrO | 2 to 20%, |
| BaO | 0 to 2%, |
| ZnO | 0 to 4%, |
| $Li_2O$ | 0 to 2%, |
| $Na_2O$ | 0 to 10%, |
| $K_2O$ | 0 to 12%, |
| $TiO_2$ | 0 to 10%, and |
| $ZrO_2$ | 0 to 5%, | wherein MgO+CaO+SrO+BaO is at least 15%.

14. The magnetic disk according to claim 13, wherein $BaO+Li_2O+Na_2O+K_2O$ is at most 14%.

15. The magnetic disk according to claim 13, wherein $Li_2O+ZnO$ is at most 2%.

16. A magnetic disk made of the glass for a substrate as claimed in claim 13, wherein the number of attachments having sizes of at least 10 μm present on the surface of the magnetic disk held in a steam atmosphere at 120° C. under 2 atm for 20 hours, is not more than $1/cm^2$.

* * * * *

UNITED STATES PATENT AND TRADEMARK OFFICE
CERTIFICATE OF CORRECTION

PATENT NO. : 6,949,485 B2
DATED : September 27, 2005
INVENTOR(S) : Nakashima et al.

It is certified that error appears in the above-identified patent and that said Letters Patent is hereby corrected as shown below:

<u>Title page,</u>
Item [45], should read:
-- [45] Date of Patent: *Sep. 27, 2005 --.
Item [73], should read:
-- [73] Assignee: Asahi Glass Company, Limited, Tokyo (JP) --.
Item [*] should read:
-- [*] Notice: Subject to any disclaimer, the term of this
          patent is extended or adjusted under 35
          U.S.C. 154(b) by 0 days.

This patent is subject to a terminal disclaimer. --.

Signed and Sealed this

Twenty-ninth Day of November, 2005

JON W. DUDAS
*Director of the United States Patent and Trademark Office*